US012610214B2

(12) United States Patent
Zhu et al.

(10) Patent No.: US 12,610,214 B2
(45) Date of Patent: Apr. 21, 2026

(54) TECHNIQUES FOR MANAGING MULTICAST AND BROADCAST SERVICES

(71) Applicant: ZTE CORPORATION, Shenzhen (CN)

(72) Inventors: Hao Zhu, Shenzhen (CN); Lin Chen, Shenzhen (CN); Tao Qi, Shenzhen (CN); Weiqiang Du, Shenzhen (CN); Liping Wang, Shenzhen (CN); Shuqiang Xia, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 456 days.

(21) Appl. No.: 18/105,531

(22) Filed: Feb. 3, 2023

(65) Prior Publication Data

US 2023/0188948 A1     Jun. 15, 2023

Related U.S. Application Data

(63) Continuation of application No. PCT/CN2020/107337, filed on Aug. 6, 2020.

(51) Int. Cl.
*H04W 4/06* (2009.01)
*H04L 1/1812* (2023.01)
*H04W 80/02* (2009.01)

(52) U.S. Cl.
CPC ............. *H04W 4/06* (2013.01); *H04L 1/1812* (2013.01); *H04W 80/02* (2013.01)

(58) Field of Classification Search
CPC ....... H04W 4/06; H04W 80/02; H04W 72/56; H04W 72/30; H04W 72/21; H04W 80/10; H04L 1/1812; H04L 1/1874
See application file for complete search history.

(56) References Cited

U.S. PATENT DOCUMENTS

| | | | |
|---|---|---|---|
| 2010/0322129 | A1 | 12/2010 | Niu et al. |
| 2012/0275369 | A1 | 11/2012 | Zhang et al. |
| 2013/0083715 | A1 | 4/2013 | Etemad et al. |
| 2014/0211685 | A1 | 7/2014 | Kim et al. |

(Continued)

FOREIGN PATENT DOCUMENTS

| | | |
|---|---|---|
| CN | 101114921 A | 1/2008 |
| CN | 101674526 | 3/2010 |

(Continued)

OTHER PUBLICATIONS

Partial Supplementary European Search Report issued Jun. 13, 2023 in corresponding European Patent Application No. 20948661.2.

(Continued)

*Primary Examiner* — Abdullahi Ahmed
(74) *Attorney, Agent, or Firm* — Crowell & Moring LLP

(57) ABSTRACT

Techniques are described for a radio access network (RAN) system to obtain and manage the priority information that indicates priorities of the multicast and broadcast services (MBS). An example wireless communication method includes receiving, by a first network node from a second network node, priority information that indicates a priority of a multicast and broadcast service (MBS), and determining, by the first network, based on the priority indicated by the priority information, a reception priority of the MBS.

16 Claims, 13 Drawing Sheets

Receiving, by a first network node from a second network node, priority information that indicates a priority of a multicast and broadcast service (MBS) — 102

Determining, by the first network, based on the priority indicated by the priority information, a reception priority of the MBS — 104

(56) References Cited

U.S. PATENT DOCUMENTS

| | | | |
|---|---|---|---|
| 2017/0310497 A1 | 10/2017 | Kim et al. | |
| 2017/0366363 A1 | 12/2017 | Hong et al. | |
| 2018/0139665 A1* | 5/2018 | Park | H04W 36/0061 |
| 2020/0077287 A1 | 3/2020 | Prasad et al. | |
| 2022/0369285 A1* | 11/2022 | Takeda | H04L 1/1822 |
| 2023/0082017 A1* | 3/2023 | Hong | H04W 76/22 |
| | | | 370/312 |
| 2023/0163896 A1* | 5/2023 | Lin | H04L 1/1858 |
| | | | 370/312 |
| 2023/0189263 A1* | 6/2023 | Lee | H04L 27/26 |
| | | | 370/329 |
| 2023/0269758 A1* | 8/2023 | Wu | H04W 72/23 |
| | | | 370/312 |
| 2023/0300682 A1* | 9/2023 | Pham Van | H04W 36/0007 |
| | | | 370/312 |
| 2023/0403537 A1* | 12/2023 | Chou | H04W 4/06 |

FOREIGN PATENT DOCUMENTS

| | | |
|---|---|---|
| CN | 102355708 | 2/2012 |
| CN | 102355708 A | 2/2012 |
| CN | 103856970 | 6/2014 |
| CN | 103975543 A | 8/2014 |
| CN | 109983789 A | 7/2019 |
| EP | 2053761 A1 | 4/2009 |
| EP | 4 156 727 | 3/2023 |
| JP | 2014-528667 A | 10/2014 |
| KR | 10-2014-0018358 A | 2/2014 |
| KR | 10-2016-0086269 A | 7/2016 |
| WO | WO 2020/146507 A1 | 7/2020 |

OTHER PUBLICATIONS

International Search Report issued April 29, 2021 in (PCT) Application No. PCT/CN2020/107337.

ETSI MCC. "Report of 3GPP TSG RAN2#109bis-e Meeting, Online" 3GPP TSG-RAN WG2 meeting #110-e R2-20043XX, Apr. 30, 2020 (Apr. 30, 2020), section 5.

Office action in Chinese application No. 202080104165.7, dated Jul. 30, 2024, 19 pages (with English translation).

Qualcomm Incorporated, "MBMS reception in Receive Only Mode," 3GPP TSG-RAN2 Meeting #104, dated Oct. 2018, 10 pages.

Office Action issued Jul. 21, 2024 in corresponding Korean Patent Application No. 10-2023-7004249.

Extended European Search Report issued Sep. 13, 2023 in corresponding European Patent Application No. 20948661.2.

Chinese-language Office Action issued in Chinese Application No. 202080104165.7 dated Mar. 11, 2025 with English translation (14 pages).

Office Action issued Mar. 1, 2024 in corresponding Japanese Patent Application No. 2023-507418.

Office action issued in Japanese application No. 2023-507418, dated Aug. 22, 2024, 11 pages (with English translation).

* cited by examiner

Receiving, by a first network node from a second network node, priority information that indicates a priority of a multicast and broadcast service (MBS) — 102

Determining, by the first network, based on the priority indicated by the priority information, a reception priority of the MBS — 104

Determining, by a user equipment, that a number of a plurality of transmissions scheduled for the user equipment over a shared channel exceed a capability of the user equipment

202

Performing reception of one or more of the plurality of transmissions based on a priority of a multicast and broadcast service (MBS)

204

Operating, by a medium access control (MAC) entity of a user equipment, a hybrid automatic repeat request (HARQ) entity and a number of multicast broadcast service (MBS) processes

302

Determining that a received downlink assignment for a MBS related radio network temporary identifier (RNTI) and associated HARQ information are indicated to the MBS HARQ entity

304

402

Determining, by a medium access control (MAC) entity of a user equipment, that a received downlink assignment for a MBS related radio network temporary identifier (RNTI) and associated hybrid automatic repeat request (HARQ) information are indicated to a HARQ entity

404

Associating the MBS process with the MBS related RNTI for the downlink assignment

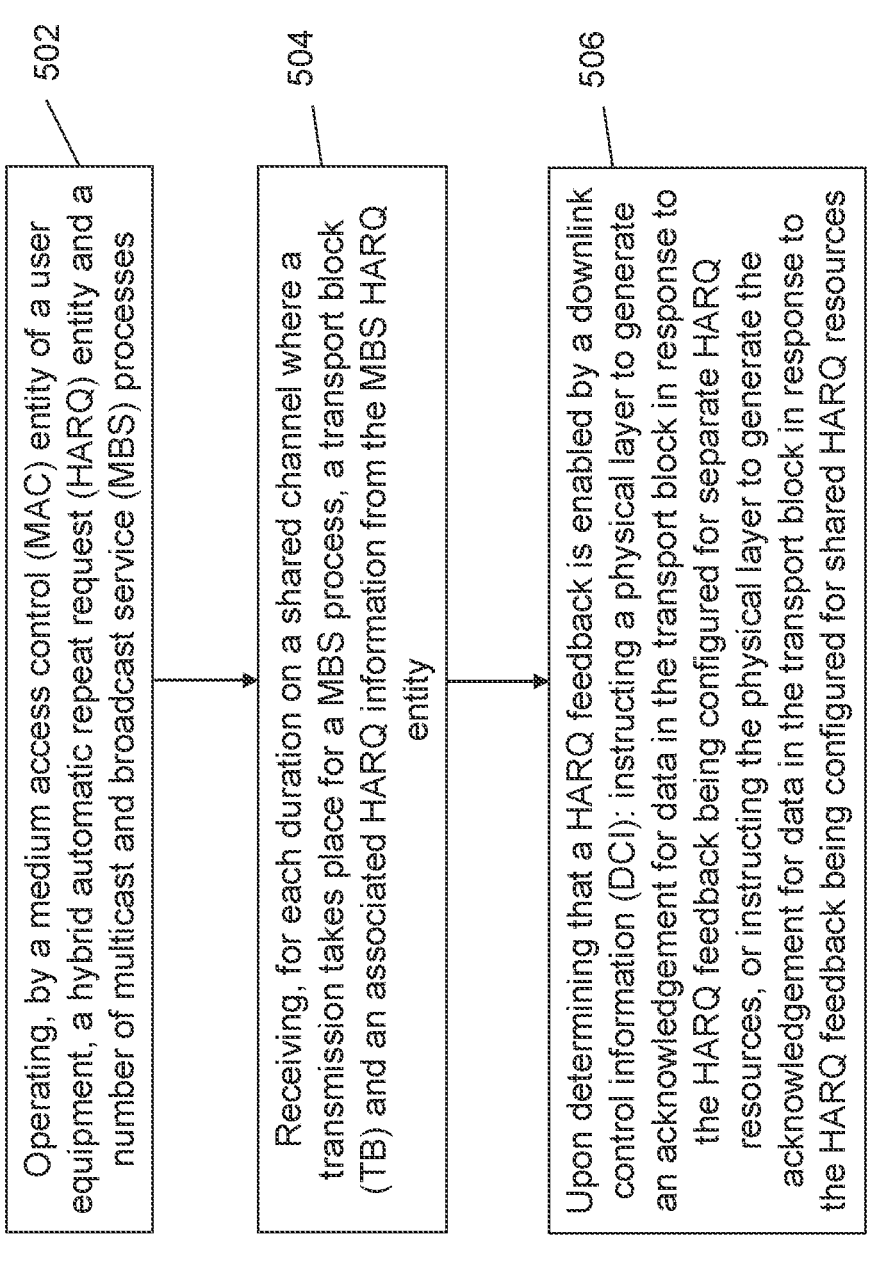

502

Operating, by a medium access control (MAC) entity of a user equipment, a hybrid automatic repeat request (HARQ) entity and a number of multicast and broadcast service (MBS) processes

504

Receiving, for each duration on a shared channel where a transmission takes place for a MBS process, a transport block (TB) and an associated HARQ information from the MBS HARQ entity

506

Upon determining that a HARQ feedback is enabled by a downlink control information (DCI): instructing a physical layer to generate an acknowledgement for data in the transport block in response to the HARQ feedback being configured for separate HARQ resources, or instructing the physical layer to generate the acknowledgement for data in the transport block in response to the HARQ feedback being configured for shared HARQ resources

FIG. 5

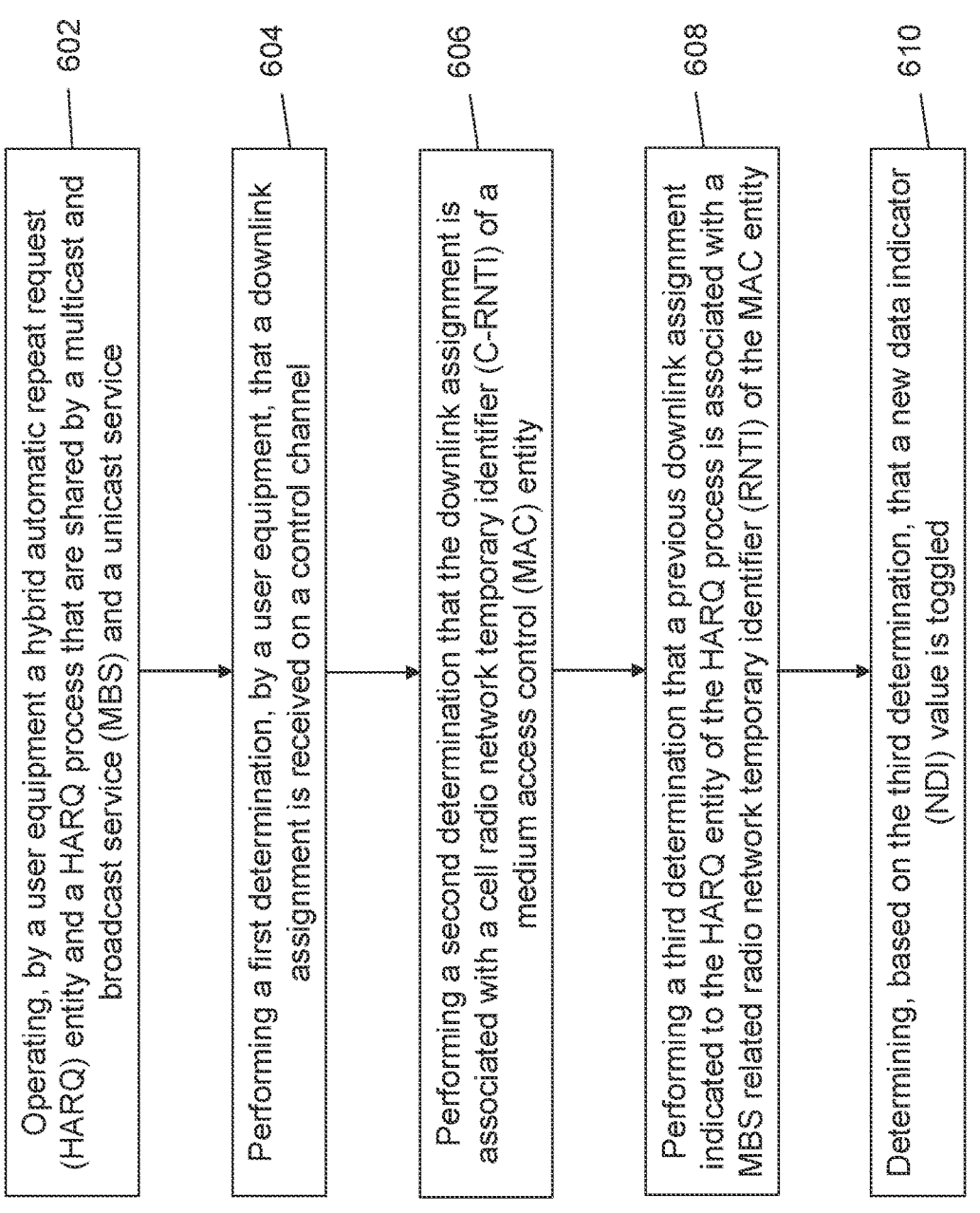

Operating, by a user equipment a hybrid automatic repeat request (HARQ) entity and a HARQ process that are shared by a multicast and broadcast service (MBS) and a unicast service ⌐ 602

Performing a first determination, by a user equipment, that a downlink assignment is received on a control channel ⌐ 604

Performing a second determination that the downlink assignment is associated with a cell radio network temporary identifier (C-RNTI) of a medium access control (MAC) entity ⌐ 606

Performing a third determination that a previous downlink assignment indicated to the HARQ entity of the HARQ process is associated with a MBS related radio network temporary identifier (RNTI) of the MAC entity ⌐ 608

Determining, based on the third determination, that a new data indicator (NDI) value is toggled ⌐ 610

FIG. 6

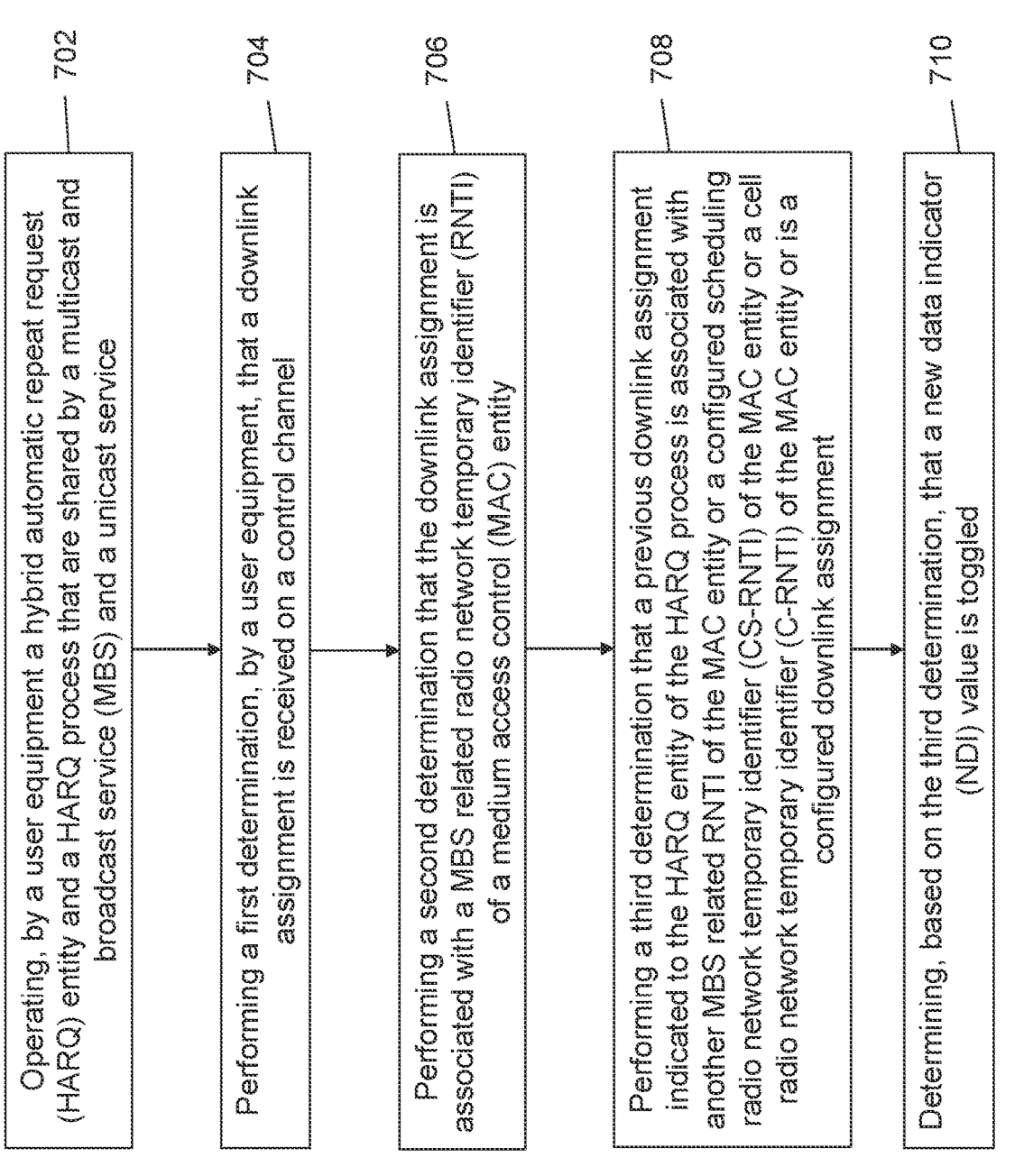

Operating, by a user equipment a hybrid automatic repeat request (HARQ) entity and a HARQ process that are shared by a multicast and broadcast service (MBS) and a unicast service — 702

Performing a first determination, by a user equipment, that a downlink assignment is received on a control channel — 704

Performing a second determination that the downlink assignment is associated with a MBS related radio network temporary identifier (RNTI) of a medium access control (MAC) entity — 706

Performing a third determination that a previous downlink assignment indicated to the HARQ entity of the HARQ process is associated with another MBS related RNTI of the MAC entity or a configured scheduling radio network temporary identifier (CS-RNTI) of the MAC entity or a cell radio network temporary identifier (C-RNTI) of the MAC entity or is a configured downlink assignment — 708

Determining, based on the third determination, that a new data indicator (NDI) value is toggled — 710

FIG. 7

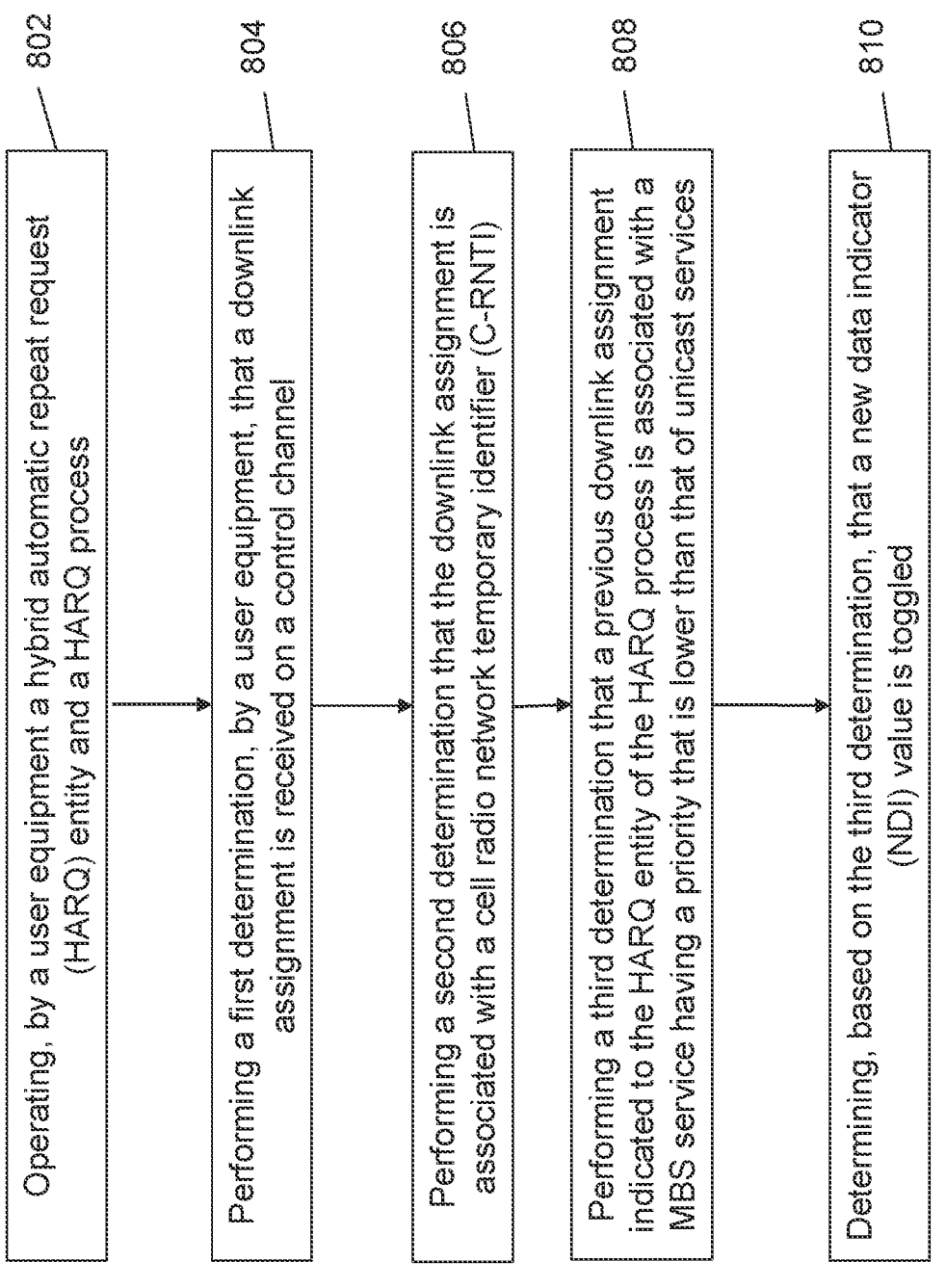

802

Operating, by a user equipment a hybrid automatic repeat request (HARQ) entity and a HARQ process

804

Performing a first determination, by a user equipment, that a downlink assignment is received on a control channel

806

Performing a second determination that the downlink assignment is associated with a cell radio network temporary identifier (C-RNTI)

808

Performing a third determination that a previous downlink assignment indicated to the HARQ entity of the HARQ process is associated with a MBS service having a priority that is lower than that of unicast services

810

Determining, based on the third determination, that a new data indicator (NDI) value is toggled

FIG. 8

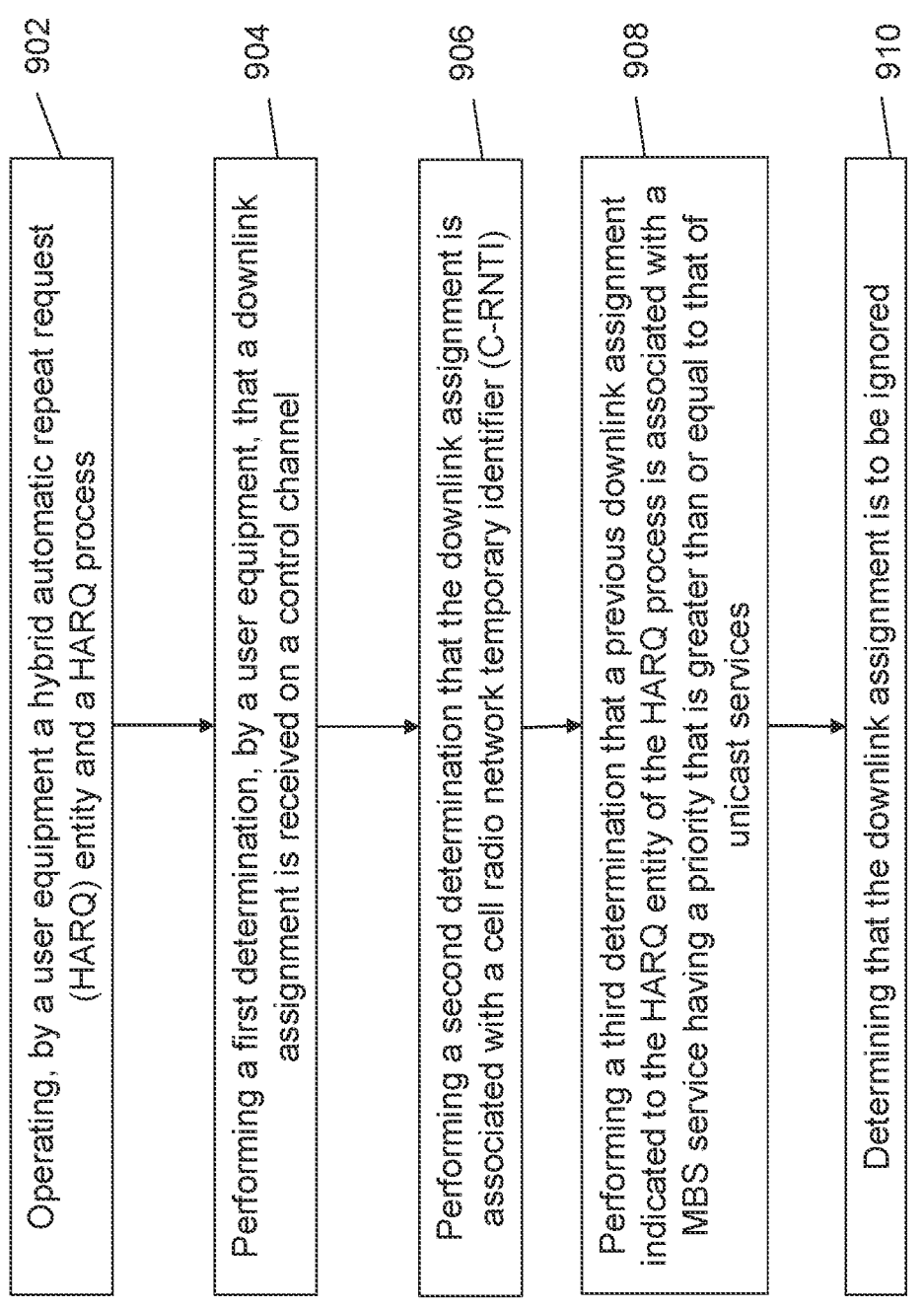

FIG. 9

902 — Operating, by a user equipment a hybrid automatic repeat request (HARQ) entity and a HARQ process 904 — Performing a first determination, by a user equipment, that a downlink assignment is received on a control channel 906 — Performing a second determination that the downlink assignment is associated with a cell radio network temporary identifier (C-RNTI)

908 — Performing a third determination that a previous downlink assignment indicated to the HARQ entity of the HARQ process is associated with a MBS service having a priority that is greater than or equal to that of unicast services 910 — Determining that the downlink assignment is to be ignored

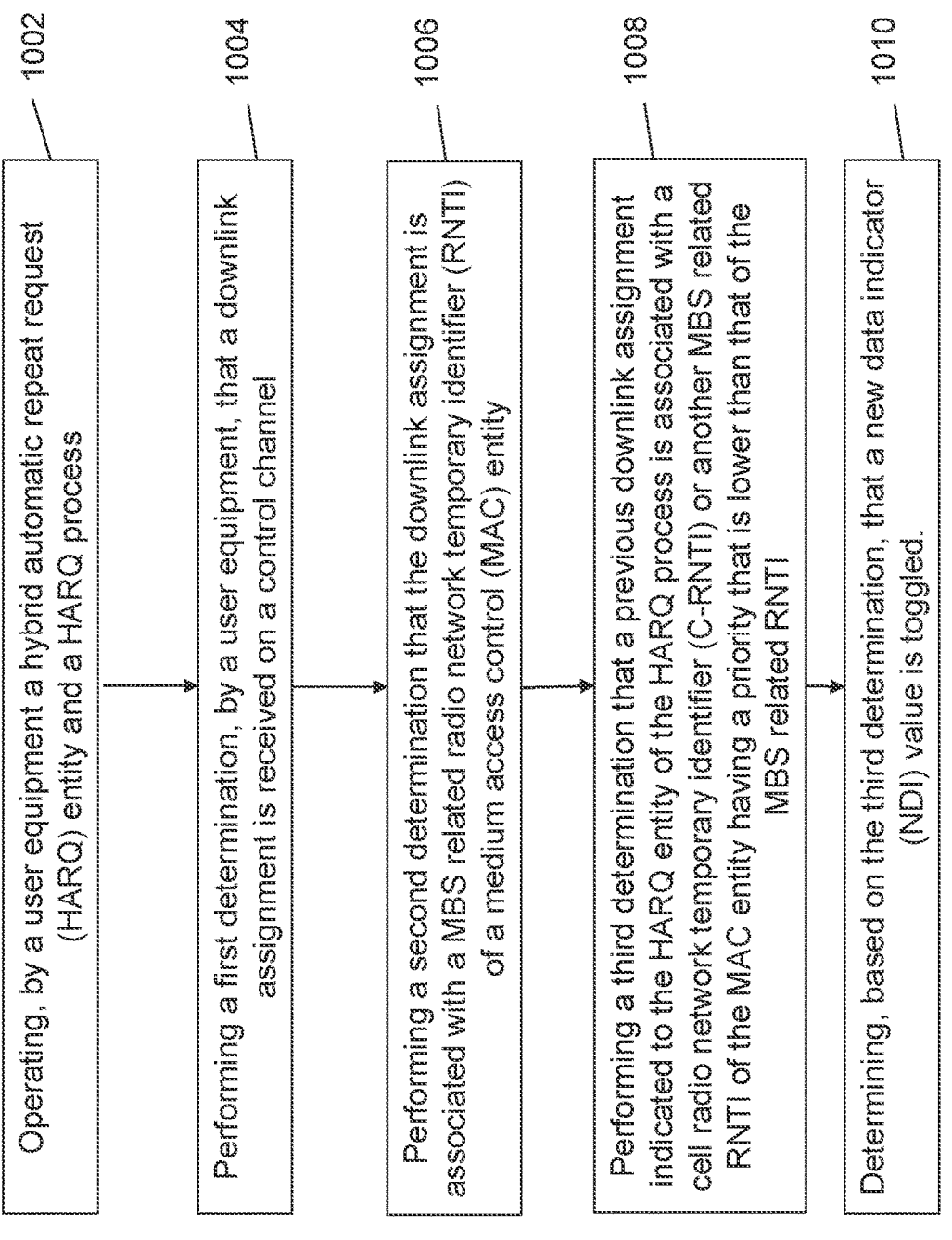

1002

Operating, by a user equipment a hybrid automatic repeat request (HARQ) entity and a HARQ process

1004

Performing a first determination, by a user equipment, that a downlink assignment is received on a control channel

1006

Performing a second determination that the downlink assignment is associated with a MBS related radio network temporary identifier (RNTI) of a medium access control (MAC) entity

1008

Performing a third determination that a previous downlink assignment indicated to the HARQ entity of the HARQ process is associated with a cell radio network temporary identifier (C-RNTI) or another MBS related RNTI of the MAC entity having a priority that is lower than that of the MBS related RNTI

1010

Determining, based on the third determination, that a new data indicator (NDI) value is toggled.

FIG. 10A

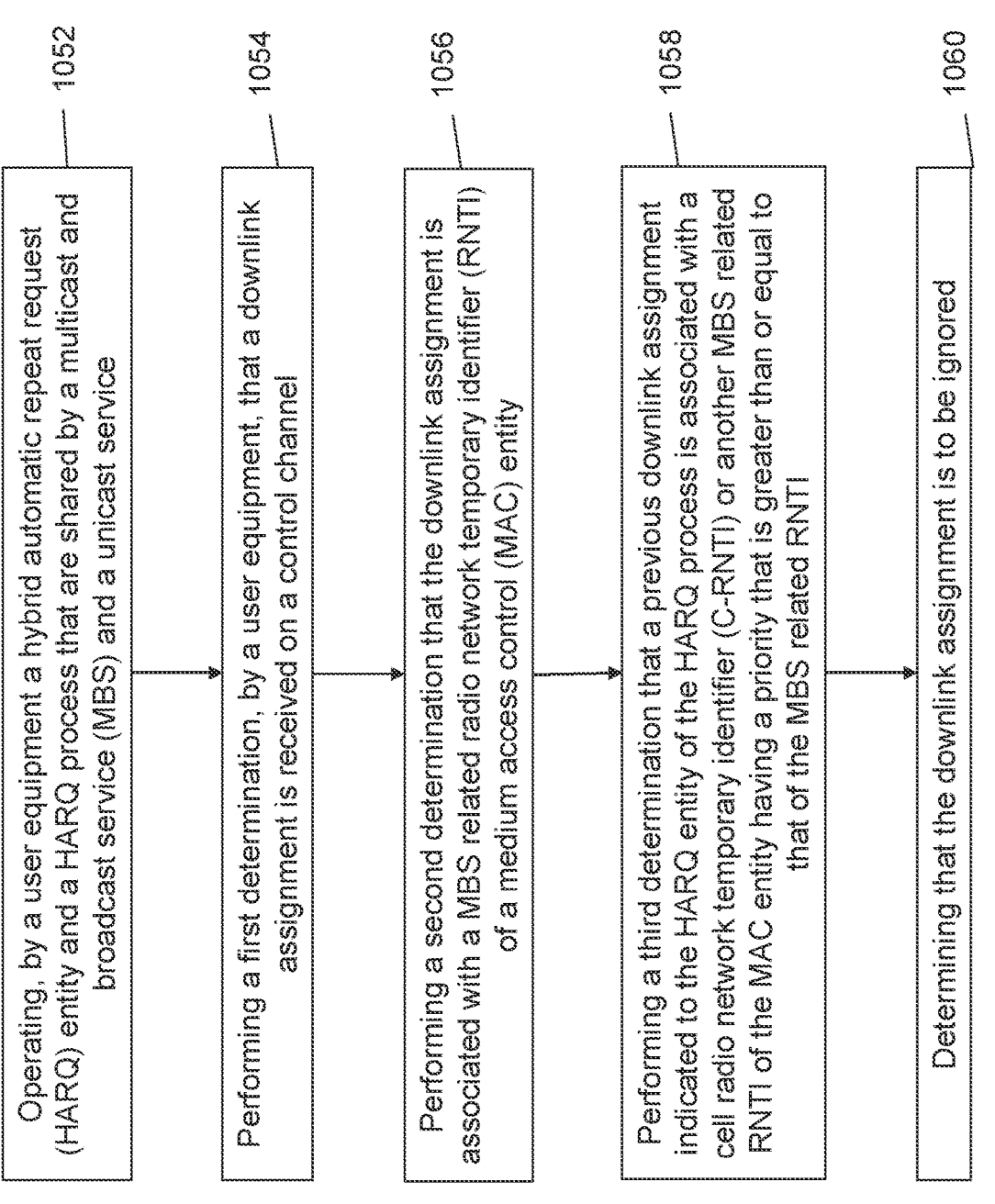

Operating, by a user equipment a hybrid automatic repeat request (HARQ) entity and a HARQ process that are shared by a multicast and broadcast service (MBS) and a unicast service — 1052

Performing a first determination, by a user equipment, that a downlink assignment is received on a control channel — 1054

Performing a second determination that the downlink assignment is associated with a MBS related radio network temporary identifier (RNTI) of a medium access control (MAC) entity — 1056

Performing a third determination that a previous downlink assignment indicated to the HARQ entity of the HARQ process is associated with a cell radio network temporary identifier (C-RNTI) or another MBS related RNTI of the MAC entity having a priority that is greater than or equal to that of the MBS related RNTI — 1058

Determining that the downlink assignment is to be ignored — 1060

Memory 1105

Processor(s) 1110

Transmitter 1115

Receiver 1120

1202

MAC entity

Unicast HARQ entity

HARQ process 1

... HARQ process N

MBS HARQ entity

MBS process 1

... MBS process M (1) Unicast service and multicast / broadcast service use different HARQ

1204

MAC entity

HARQ entity

HARQ process 1

... HARQ process M+N (2) Unicast service and multicast / broadcast service use the same HARQ

TECHNIQUES FOR MANAGING MULTICAST AND BROADCAST SERVICES

This application is a continuation application of PCT International Application No. PCT/CN2020/107337, filed with the China National Intellectual Property Administration, PRC on Aug. 6, 2020, which is herein incorporated by reference in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

A cell may transmit several multicast and broadcast services (MBS). MBS may include a technology for mobile network data source nodes to transmit data to multiple target nodes, which can realize the sharing and effective use of network resources, especially air interface resources. Different MBS services may have different priorities that may be received by UEs. To enable the base station to make an appropriate scheduling decision, the priority of MBS service can be known by the base station. This patent application describes techniques to solve the technical problem of how the radio access network (RAN) system obtains and handles the information on MBS services' priorities.

A first example wireless method includes receiving, by a first network node from a second network node, priority information that indicates a priority of a multicast and broadcast service (MBS); and determining, by the first network, based on the priority indicated by the priority information, a reception priority of the MBS. In some embodiments, the priority information includes the priority of the identifier associated with the MBS. In some embodiments, the identifier includes a MBS service identifier, a MBS session identifier, a temporary mobile group identifier (TMGI), a subset of a quality of services (QoS) flows in a MBS session, a multicast radio bearer (MRB) identifier, or a unique identification of an interface over which the a MBS service or a MBS session is established between the first network node and the second network node.

In some embodiments, the priority information includes an indication of whether one or more user equipment connected to the first network node prioritizes reception of a plurality of multimedia broadcast multicast services (MBMS) above reception of any one unicast service. In some embodiments, the priority information includes a list of MBS services which one or more user equipment are receiving or are interested to receive. In some embodiments, the list of MBS services includes one or more identifiers arranged in an order that indicates the priority of the one or more identifiers. In some embodiments, the priority information is associated with an identifier of a user equipment, or the priority information is associated with a plurality of user equipment that are receiving or are interested to receive the MBS.

In some embodiments, the priority information is received via a next generation application protocol (NGAP) message using a MBS session-associated signaling. In some embodiments, the priority information is received via a next generation application protocol (NGAP) message using a user equipment associated signaling. In some embodiments, the priority information is received via a F1 application protocol (F1AP) message using a MBS session-associated signaling. In some embodiments, the priority information is received via a F1 application protocol (F1AP) message using a user equipment associated signaling. In some embodiments, the priority information is received via a radio resource control (RRC) message or a medium access control-control element (MAC CE) dedicated to a user equipment.

In some embodiments, the priority information is received via a radio resource control (RRC) message through a broadcast channel. In some embodiments, the priority information is received via system information or a medium access control-control element (MAC CE) broadcast in a cell. In some embodiments, the first network node includes a base station and the second network node includes a core network. In some embodiments, the first network node includes a distributed unit and the second network node includes a centralized unit. In some embodiments, the first network node includes a user equipment and the second network node includes a base station. In some embodiments, the first network node includes a base station and the second network node includes a user equipment.

A second example wireless communication method includes determining, by a user equipment, that a number of a plurality of transmissions scheduled for the user equipment over a shared channel exceed a capability of the user equipment; and performing reception of one or more of the plurality of transmissions based on a priority of a multicast and broadcast service (MBS), where the priority of the MBS is indicated by an upper layer or by a medium access control element (MAC CE).

A third example method of wireless communication includes determining, by a medium access control (MAC) entity of a user equipment, that a received downlink assignment for a MBS related radio network temporary identifier (RNTI) and associated hybrid automatic repeat request (HARQ) information are indicated to a HARQ entity, where the HARQ entity is a MBS HARQ entity for MBS services and manages MBS processes, and where for the downlink assignment, the MBS HARQ entity directs transport blocks (TBs) to a MBS process indicated in the associated HARQ information. In some embodiments, the MAC entity is configured to receive the downlink assignment associated with the MBS related RNTI by an upper layer.

A fourth example method of wireless communication includes determining, by a medium access control (MAC) entity of a user equipment, that a received downlink assignment for a MBS related radio network temporary identifier (RNTI) and associated hybrid automatic repeat request (HARQ) information are indicated to a HARQ entity, where the HARQ entity is a MBS HARQ entity for MBS services and manages MBS processes, and where for the downlink assignment, the MBS HARQ entity allocates one or more received transport blocks and associated HARQ information to an unoccupied MBS process; and associating the MBS process with the MBS related RNTI for the downlink assignment. In some embodiments, the method further includes performing the determination, upon receiving a new transport block, that the MBS HARQ entity does not include an unoccupied MBS process; and considering, in response to the performing the determination, an occupied MBS process who is corresponding to a MBS service with a lowest priority as an unoccupied MBS process. In some embodiments, the occupied MBS process is selected or randomly selected from a plurality of MBS processes having the lowest priority.

A fifth example method of wireless communication includes operating, by a medium access control (MAC) entity of a user equipment, a hybrid automatic repeat request (HARQ) entity and a number of multicast and broadcast service (MBS) processes, where the HARQ entity is a MBS HARQ entity for MBS services, and where the MBS processes correspond to the MBS HARQ entity; receiving, for each duration on a shared channel where a transmission takes place for a MBS process, a transport block (TB) and an associated HARQ information from the MBS HARQ entity; and upon determining that a HARQ feedback is enabled by a downlink control information (DCI): instructing a physical layer to generate an acknowledgement for data in the transport block in response to the HARQ feedback being configured for separate HARQ resources, or instructing the physical layer to generate the acknowledgement for data in the transport block in response to the HARQ feedback being configured for shared HARQ resources.

A sixth example method of wireless communication includes operating, by a user equipment a hybrid automatic repeat request (HARQ) entity and a HARQ process that are shared by a multicast and broadcast service (MBS) and a unicast service; performing a first determination, by a user equipment, that a downlink assignment is received on a control channel, where the downlink assignment is for an occasion on the control channel and for a serving cell to which the user equipment is connected; performing a second determination that the downlink assignment is associated with a cell radio network temporary identifier (C-RNTI) of a medium access control (MAC) entity; performing a third determination that a previous downlink assignment indicated to the HARQ entity of the HARQ process is associated with a MBS related radio network temporary identifier (RNTI) of the MAC entity, where the previous downlink assignment is received prior to the downlink assignment; and determining, based on the third determination, that a new data indicator (NDI) value is toggled.

A seventh example method of wireless communication includes operating, by a user equipment a hybrid automatic repeat request (HARQ) entity and a HARQ process that are shared by a multicast and broadcast service (MBS) and a unicast service; performing a first determination, by a user equipment, that a downlink assignment is received on a control channel, where the downlink assignment is for an occasion on the control channel and for a serving cell to which the user equipment is connected; performing a second determination that the downlink assignment is associated with a MBS related radio network temporary identifier (RNTI) of a medium access control (MAC) entity; performing a third determination that a previous downlink assignment indicated to the HARQ entity of the HARQ process is associated with another MBS related RNTI of the MAC entity or a configured scheduling radio network temporary identifier (CS-RNTI) of the MAC entity or a cell radio network temporary identifier (C-RNTI) of the MAC entity or is a configured downlink assignment, where the previous downlink assignment is received prior to the downlink assignment; and determining, based on the third determination, that a new data indicator (NDI) value is toggled.

An eighth example method of wireless communication includes operating, by a user equipment a hybrid automatic repeat request (HARQ) entity and a HARQ process; performing a first determination, by a user equipment, that a downlink assignment is received on a control channel, wherein the downlink assignment is for an occasion on the control channel and for a serving cell to which the user equipment is connected; performing a second determination that the downlink assignment is associated with a cell radio network temporary identifier (C-RNTI); performing a third determination that a previous downlink assignment indicated to the HARQ entity of the HARQ process is associated with a MBS service having a priority that is lower than that of unicast services, wherein the previous downlink assignment is received prior to the downlink assignment; and determining, based on the third determination, that a new data indicator (NDI) value is toggled. In some embodiments, priorities of the MBS related RNTI and the C-RNTI are indicated by an upper layer or by a medium access control-control element (MAC CE). In some embodiments, the method further includes providing, to the HARQ entity and in response to the third determination, HARQ information associated with data in the downlink assignment.

A ninth example method of wireless communication includes operating, by a user equipment a hybrid automatic repeat request (HARQ) entity and a HARQ process; performing a first determination, by a user equipment, that a downlink assignment is received on a control channel, wherein the downlink assignment is for an occasion on the control channel and for a serving cell to which the user equipment is connected; performing a second determination that the downlink assignment is associated with a cell radio network temporary identifier (C-RNTI); performing a third determination that a previous downlink assignment indicated to the HARQ entity of the HARQ process is associated with a MBS service having a priority that is greater than or equal to that of unicast services, wherein the previous downlink assignment is received prior to the downlink assignment; and determining that the downlink assignment is to be ignored.

A tenth example method of wireless communication includes operating, by a user equipment a hybrid automatic repeat request (HARQ) entity and a HARQ process; performing a first determination, by a user equipment, that a downlink assignment is received on a control channel, where the downlink assignment is for an occasion on the control channel and for a serving cell to which the user equipment is connected; performing a second determination that the downlink assignment is associated with a MBS related radio network temporary identifier (RNTI) of a medium access control (MAC) entity; performing a third determination that a previous downlink assignment indicated to the HARQ entity of the HARQ process is associated with a cell radio network temporary identifier (C-RNTI) or another MBS related RNTI of the MAC entity having a priority that is lower than that of the MBS related RNTI, where the previous downlink assignment is received prior to the downlink assignment; and determining, based on the third determination, that a new data indicator (NDI) value is toggled. In some embodiments, priorities of the another MBS related RNTI and the C-RNTI are indicated by an upper layer or by a medium access control-control element (MAC CE). In some embodiments, the method further includes providing, to the HARQ entity and in response to the third determination, HARQ information associated with data in the downlink assignment.

A eleventh example method of wireless communication includes operating, by a user equipment a hybrid automatic repeat request (HARQ) entity and a HARQ process that are shared by a multicast and broadcast service (MBS) and a unicast service; performing a first determination, by a user equipment, that a downlink assignment is received on a control channel, where the downlink assignment is for an occasion on the control channel and for a serving cell to which the user equipment is connected; performing a second determination that the downlink assignment is associated with a MBS related radio network temporary identifier (RNTI) of a medium access control (MAC) entity; performing a third determination that a previous downlink assignment indicated to the HARQ entity of the HARQ process is associated with a cell radio network temporary identifier (C-RNTI) or another MBS related RNTI of the MAC entity having a priority that is greater than or equal to that of the MBS related RNTI, where the previous downlink assignment is received prior to the downlink assignment; and determining that the downlink assignment is to be ignored.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 5 shows an example flowchart for operating a MAC entity of a UE.

FIGS. 6 to 10B show example flowcharts for operating a HARQ entity and a HARQ process by a UE.

DETAILED DESCRIPTION

Figure 1:
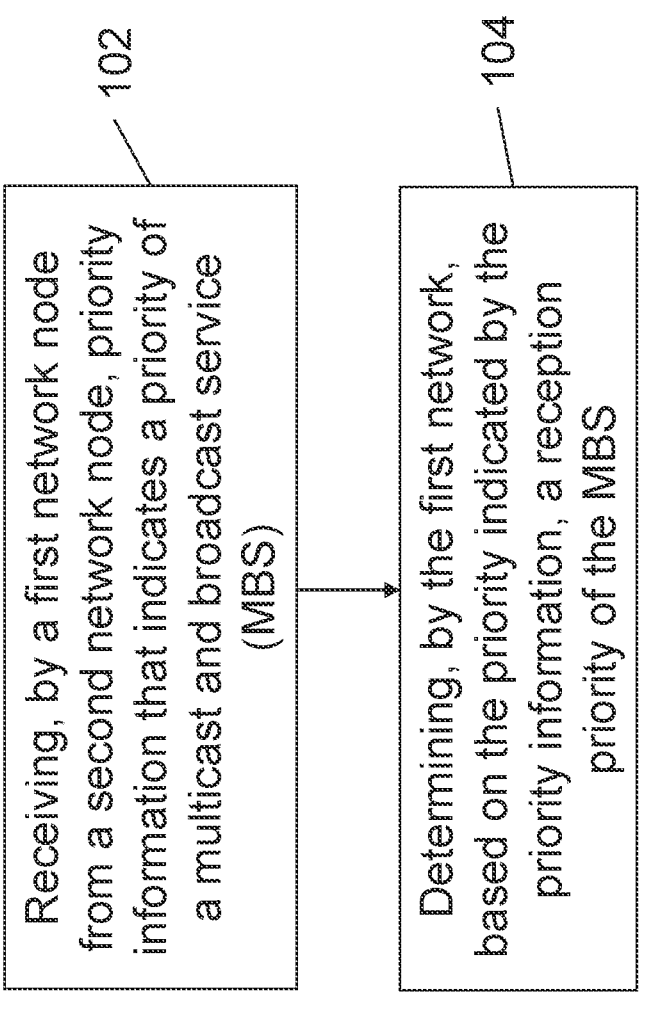
FIG. 1 shows an example flowchart for managing priority information that indicates a priority of a multicast and broadcast service (MBS).

This patent application describes, among other things, techniques that enable a radio access network (RAN) system to obtain and handle the information on MBS services' priorities. In this patent document, the term group radio network temporary identifier (G-RNTI) may include a radio network temporary identifier (RNTI) used for a multicast and broadcast service/session (also known as MBS related RNTI). The term G-RNTI may be referred to by another name for MBS service or session. The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Example 1. (The MBS Priority Information May be Sent from CN to RAN, Via MBS Session-Associated Signaling)

The MBS Priority Information may be included in a message sent from the core network (e.g., 5G Core Access and Mobility Management Function (AMF)) to the base station (e.g., RAN node). The procedure may use MBS Session-associated signaling. The message may be a MBS SESSION RESOURCE SETUP REQUEST message, or a MBS SESSION RESOURCE MODIFY REQUEST message. MBS SESSION RESOURCE SETUP REQUEST message is used to assign resources via a radio interface (Uu) and/or next generation user plane interface (NG-U) for one or several MBS services and the corresponding quality of service (QoS) flows, and to setup corresponding multicast radio bearers (MRBs). MBS SESSION RESOURCE MODIFY REQUEST message is used to enable configuration modifications of already established MBS session. MBS SESSION RESOURCE MODIFY REQUEST message is also used to enable the setup, modification and release of the QoS flow for already established MBS session.

The MBS Priority Information may be associated to each UE ID or all UEs which are receiving or interested to receive the MBS session. The UE ID may be an AMF UE NGAP ID or a RAN UE NGAP ID.

The content of the MBS Priority Information can be designed as follows.

In one example, the MBS Priority Information may be included for each MBS ID. The MBS ID may be a MBS service ID, a MBS session ID, a temporary mobile group identifier (TMGI), a subset of QoS flows in a MBS session, an AMF MBS NGAP ID which uniquely identifies the MBS service/session association over the NG interface or a RAN MBS NGAP ID which uniquely identifies the MBS service/session association over the NG interface within the RAN node. The MBS Priority Information may contain the priority of a MBS ID. For example, the MBS Priority Information may be an integer ranged from 1 to a constant value (e.g., 256).

In another example, the MBS Priority Information is implicitly indicated in the message sent from the core network to the base station. The message contains a list of MBS services which the UE(s) is (are) receiving or interested to receive, and the MBS Priority Information for each MBS ID is implicitly indicated via the ranking order of the MBS IDs in the list.

In another example, the MBS Priority Information may contain an indication whether the associated UE(s) prioritize or prioritizes reception of all MBMS services above reception of any of the unicast services.

If the MBS Priority Information is included in a message sent from the core network to base station, the base station may use it to determine a priority for scheduling the MBS service for the associated UE(s), or the base station may take into account the UE priority for receiving MBS services and unicast services.

Example 2. (The MBS Priority Information May be Sent from CN to RAN Via UE-Associated Signaling)

The MBS Priority Information may be included in a message sent from the core network (e.g., AMF) to the base station (e.g., RAN node). The procedure may use UE-associated signaling. The message may be a PDU SESSION RESOURCE SETUP REQUEST message, or a PDU SESSION RESOURCE MODIFY REQUEST message.

The content of the MBS Priority Information can be designed as follows.

In one example, the MBS Priority Information may be included for each MBS ID. The MBS ID may be a MBS service ID, a MBS session ID, a TMGI, a subset of QoS flows in a MBS session, an AMF MBS NGAP ID or a RAN MBS NGAP ID. The MBS Priority Information may contain the priority of a MBS ID. The MBS Priority Information may be an integer ranged from 1 to a constant value (e.g., 256). The MBS Priority Information is associated to a MBS ID. The MBS ID may be a MBS service ID, a MBS session ID, a TMGI, a subset of QoS flows in a MBS session.

In another example, the MBS Priority Information is implicitly indicated in the message sent from the core network to the base station. The message contains a list of MBS services which the UE is receiving or interested to receive, and the MBS Priority Information for each MBS ID is implicitly indicated via the ranking order of the MBS IDs in the list.

In another example, the MBS Priority Information may contain an indication whether the UE prioritizes reception of all MBMS services above reception of any of the unicast services.

If the MBS Priority Information is included in a message sent from the core network to base station, the base station may use it to determine a priority for scheduling the MBS ID for the associated UE(s), or the base station may take into account the UE priority for receiving MBS services and unicast services.

Example 3. (The MBS Priority Information May be Sent from gNB-CU to gNB-DU, Via MBS-Associated F1AP Signaling)

Example 3 describes how the priority information for each MBS ID is transmitted from gNB-CU to gNB-DU. The MBS Priority Information may be included in a message sent from the central unit (e.g., gNB-CU) to the distribute unit (e.g., gNB-DU). The procedure may use MBS session-associated signaling. The message may be a MBS CONTEXT SETUP REQUEST message, or a MBS CONTEXT MODIFY REQUEST message. MBS CONTEXT SETUP REQUEST message is used to establish the MBS context including, among others, MRB configuration. MBS CONTEXT MODIFY REQUEST message is used to modify the established MBS context, e.g., establishing, modifying and releasing radio resources.

The MBS Priority Information may be associated to each UE ID or all UEs which are receiving or interested to receive the MBS session.

The content of the MBS Priority Information can be designed as follows.

In one example, the MBS Priority Information may be included for each MBS ID. The MBS ID may be a MRB ID, a MBS service ID, a MBS session ID, a TMGI, a gNB-CU MBS F1AP ID or a gNB-DU MBS F1AP ID. The gNB-CU MBS F1AP ID identifies the MBS session/service association over the F1 interface within the gNB-CU. The gNB-DU MBS F1AP ID identifies the MBS session/service association over the F1 interface within the gNB-DU. The MBS Priority Information may contain the priority of a MBS ID for the associated UE(s). For example, the MBS Priority Information may be an integer ranged from 1 to a constant value (e.g., 256).

In another example, the MBS Priority Information is implicitly indicated in the message sent from the CU to the DU. The message contains a list of MBS IDs which the UE(s) is (are) receiving or interested to receive, and the MBS Priority Information for each MBS ID is implicitly indicated via the ranking order of the MBS IDs in the list.

In another example, the MBS Priority Information may contain an indication whether the associated UE(s) prioritize or prioritizes reception of all MBMS services above reception of any of the unicast services.

If the MBS Priority Information is included in a message sent from the central unit to the distribute unit, the distribute unit may use it to determine a priority for scheduling the MBS ID for the associated UE(s), or the base station may take into account the UE priority for receiving MBS services and unicast services.

Example 4. (The MBS Priority Information May be Sent from gNB-CU to gNB-DU, Via UE-Associated F1AP Signaling)

Example 4 describes how the priority information for each MBS ID is transmitted from gNB-CU to gNB-DU. The MBS Priority Information may be included in a message sent from the central unit (e.g., gNB-CU) to the distribute unit (e.g., gNB-DU). The procedure may use UE-associated signaling. The message may be a UE CONTEXT SETUP REQUEST message, or a UE CONTEXT MODIFICATION REQUEST message.

The content of the MBS Priority Information can be designed as follows.

In one example, the MBS Priority Information may be included for each MBS ID. The MBS ID may be a MRB ID, a MBS service ID, a MBS session ID, a TMGI, a G-RNTI, a gNB-CU UE F1AP ID or a gNB-DU UE F1AP ID. The MBS Priority Information may contain the priority of a MBS ID for the UE. For example, the MBS Priority Information may be an integer ranged from 1 to a constant value (e.g., 256).

In another example, the MBS Priority Information is implicitly indicated in the message sent from the core network to the base station. The message contains a list of MBS IDs which the UE is receiving or interested to receive, and the MBS Priority Information for each MBS ID is implicitly indicated via the ranking order of the MBS IDs in the list.

In another example, the MBS Priority Information may contain an indication whether the UE prioritizes reception of all MBMS services above reception of any of the unicast services.

If the MBS Priority Information is included in a message sent from the central unit to the distribute unit, the distribute unit may use it to determine a priority for scheduling the MBS ID for the UE, or the base station may take into account the UE priority for receiving MBS services and unicast services.

Example 5. (The MBS Priority Information May be Sent Between UE and RAN, Via RRC/System Information/MAC CE)

Example 5 describes how the priority information for each MBS ID is transmitted between UE and RAN. The MBS Priority Information may be sent from a UE to the base station or the MBS Priority Information may be sent from a base station to a UE.

The procedure may be initiated upon at least one of the following conditions: upon change of interest, upon change of bearer mode, upon change of priority of MBS services, upon change of priority between MBS reception and unicast reception.

The MBS Priority Information may be included into a RRC message or a system information or a MAC CE.

The content of the MBS Priority Information can be designed as follows.

In one example, the MBS Priority Information may be included for each MBS ID. The MBS ID may be a MBS service ID, a MBS session ID, a TMGI, a G-RNTI, or a subset of QoS flows in a MBS session which is interested or being received by the UE. The MBS Priority Information may contain the priority of a MBS ID. The MBS Priority Information may be an integer ranged from 1 to a constant value (e.g., 256). The MBS Priority Information is associated to a MBS service ID. The MBS ID may also be a MBS service ID, MBS session ID, a TMGI, or a subset of QoS flows in a MBS session.

In another example, the MBS Priority Information is implicitly indicated in the message sent from the UE to the base station. The message contains a list of MBS services which the UE is receiving or interested to receive, and the MBS Priority Information for each MBS ID is implicitly indicated via the ranking order of the MBS IDs in the list.

In another example, the MBS Priority Information may contain an indication whether the UE prioritizes reception of all MBMS services above reception of any of the unicast services.

In another example, the MBS Priority Information may contain an indication of a threshold of the priority for unicast services, and/or a threshold of the priority for multicast services.

In another example, the UE may set the value of MBS Priority Information for each MBS ID according to the information related to service priority from application layer for the example scenario where the UE sends the MBS Priority Information to the RAN.

In another example, the base station may set the value of MBS Priority Information for each MBS ID according to at least one of the following information: the priority information (e.g., ARP) of QoS flows, the MBS Priority Information received from core network for the example scenario where the RAN sends the MBS Priority Information to the UE.

In another example, the distribute unit may set the value of MBS Priority Information for each MBS ID according to at least one of the following information: the priority information (e.g., ARP) of QoS flows, the MBS Priority Information received from central unit, the priority information of DRB/MRB for the example scenario where the RAN sends the MBS Priority Information to the UE.

If the MBS Priority Information is received by the base station, the base station may use it to determine a priority for scheduling the MBS ID for the UE, or the base station may take into account the UE priority for receiving MBS services and unicast services.

FIG. 1 shows an example flowchart for managing priority information that indicates a priority of a multicast and broadcast service (MBS). Operation 102 includes receiving, by a first network node from a second network node, priority information that indicates a priority of a multicast and broadcast service (MBS). Operation 104 includes determining, by the first network, based on the priority indicated by the priority information, a reception priority of the MBS. In some embodiments, the priority information includes the priority of an identifier associated with the MBS. In some embodiments, the identifier includes a MBS service identifier, a MBS session identifier, a temporary mobile group identifier (TMGI), a subset of a quality of services (QoS) flows in a MBS session, a multicast radio bearer (MRB) identifier, or a unique identification of an interface over which the a MBS service or a MBS session is established between the first network node and the second network node.

In some embodiments, the priority information includes an indication of whether one or more user equipment connected to the first network node prioritizes reception of a plurality of multimedia broadcast multicast services (MBMS) above reception of any one unicast service. In some embodiments, the priority information includes a list of MBS services which one or more user equipment are receiving or are interested to receive. In some embodiments, the list of MBS services includes one or more identifiers arranged in an order that indicates the priority of the one or more identifiers. In some embodiments, the priority information is associated with an identifier of a user equipment, or the priority information is associated with a plurality of user equipment that are receiving or are interested to receive the MBS.

In some embodiments, the priority information is received via a next generation application protocol (NGAP) message using a MBS session-associated signaling. In some embodiments, the priority information is received via a next generation application protocol (NGAP) message using a user equipment associated signaling. In some embodiments, the priority information is received via a F1 application protocol (F1AP) message using a MBS session-associated signaling. In some embodiments, the priority information is received via a F1 application protocol (F1AP) message using a user equipment associated signaling. In some embodiments, the priority information is received via a radio resource control (RRC) message or a medium access control-control element (MAC CE) dedicated to a user equipment.

In some embodiments, the priority information is received via a radio resource control (RRC) message through a broadcast channel. In some embodiments, the priority information is received via system information or a medium access control-control element (MAC CE) broadcast in a cell. In some embodiments, the first network node includes a base station and the second network node includes a core network. In some embodiments, the first network node includes a distributed unit and the second network node includes a centralized unit. In some embodiments, the first network node includes a user equipment and the second network node includes a base station. In some embodiments, the first network node includes a base station and the second network node includes a user equipment.

Example 6. (The Behavior of UE May be Affected by the Priority Information Through Following Ways)

Examples 6 describes possible ways that the priority information affects the behavior of MAC. If a UE is scheduled with PDSCH transmissions exceeding its processing capability, the MAC entity prioritizes the reception of these PDSCH transmissions according to the priority of each G-RNTI/MBS Service, where the priority is indicated/configured by upper layers or indicated by MAC CE.

The number of G-RNTIs/MBS Services for parallel reception is limited according to UE's processing capability.

The G-RNTIs/MBS Services with higher priority are prioritized to be received.

In another example, the priority of a PDSCH transmission or downlink assignment for multicast/broadcast/unicast service is included in DCI. The MAC entity of the UE prioritizes these PDSCH transmissions according to the priority information indicated on DCI.

In another example, an information on a threshold of the priority for unicast services, and/or a threshold of the priority for multicast services may be configured to the UE by the base station via a RRC message or a MAC CE. The UE prioritizes the transmission for the MBS or unicast service which has a priority indicated on DCI higher than the threshold configured by upper layers or MAC CE.

Figure 2:
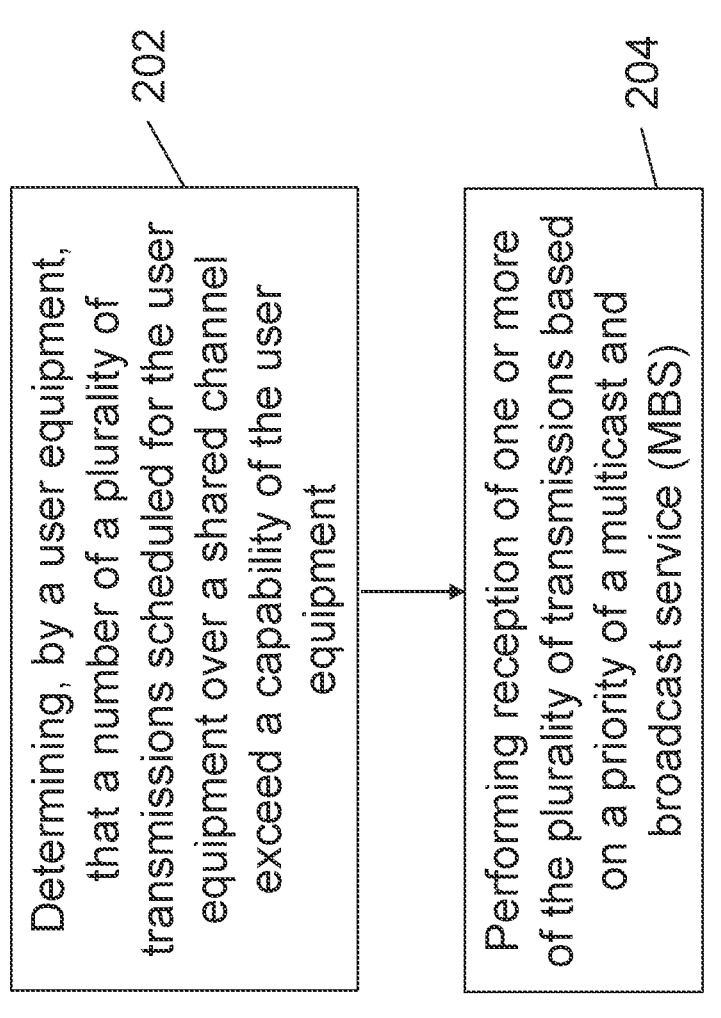
FIG. 2 shows an example flowchart for managing a priority of a multicast and broadcast service (MBS) related radio network temporary identifier (RNTI) or of a MBS when a number of transmissions exceed a UE's capability.

FIG. 2 shows an example flowchart for managing a priority of a MBS related radio network temporary identifier (RNTI) or of a multicast and broadcast service (MBS) when a number of transmissions exceed a UE's capability. Operation 202 includes determining, by a user equipment, that a number of a plurality of transmissions scheduled for the user equipment over a shared channel exceed a capability of the user equipment. Operation 204 includes performing reception of one or more of the plurality of transmissions based on a priority of a multicast and broadcast service (MBS), where the priority of the MBS is indicated by an upper layer or by a medium access control element (MAC CE).

Example 7. (The Behavior of UE and RAN May be Affected by the Priority Information Through Following Ways)

Example for the behavior of RAN is as follows:

Example 7-1, RAN may make the scheduling decision based on the MBS Priority Information. For example, when HARQ Processes are shared between unicast and multicast services. The RAN may decide the downlink assignments based on the MBS Priority Information.

Examples for the behavior of UE are as follows:

According to the downlink assignments received on the PDCCH, the UE's MAC entity has following actions.

Example 7-1 describes an example of UE's behavior when HARQ processes are not shared between unicast and multicast services. The details of Example 7-1 is as follows.

Example 7-1. In one example, there is at most one MBS HARQ Entity at the MAC entity for multicast/broadcast reception for each Serving Cell, which maintains a number of parallel MBS processes. In another example, the MBS HARQ Entity is the HARQ Entity which maintains a number of parallel HARQ processes for unicast services and a number of parallel MBS processes for multicast services. Each MBS process is associated with a G-RNTI or MBS service of the downlink assignment. This interest is indicated by upper layers. The MBS HARQ Entity directs MBS transmission information and associated TBs received on the DL-SCH to the corresponding MBS processes. The number of Receiving MBS processes associated with the MBS HARQ Entity is defined as a constant number.

Example for the Behavior of MAC Entity Contains at Least One of the Following Operations When the MAC entity has a C-RNTI, Temporary C-RNTI, or CS-RNTI or G-RNTI, the MAC entity may for each PDCCH occasion during which it monitors PDCCH and for each Serving Cell perform the following operations:

1> if a downlink assignment for this PDCCH occasion has been received on the PDCCH for the G-RNTI:
    2> indicate the presence of a downlink assignment and deliver the associated HARQ information and G-RNTI to the MBS HARQ entity.

Example for the Behavior of HARQ Entity Contains at Least One of the Following Operations The MBS HARQ entity may perform the following operations:

1> for each downlink assignment indicated to the MBS HARQ entity:
    2> if the NDI has been toggled compared to the value of the previous received transmission corresponding to this TB or this is the very first received transmission for this TB:
      3> allocate the TB(s) received from the physical layer and the associated HARQ information to an unoccupied MBS process, associate the MBS process with this G-RNTI or the corresponding MBS service and consider this transmission to be a new transmission.

NOTE1: When a new TB arrives, if there is no unoccupied MBS process in the MBS HARQ entity, how to manage receiving MBS processes is up to UE implementation.

NOTE2: When a new TB arrives, if there is no unoccupied MBS process in the MBS HARQ entity, the occupied MBS process with lowest priority is allocated to an unoccupied MBS process. If there are several MBS processes with the lowest priority, any one of these several MBS processes can be allocated to this TB.

1> for each MBS process:
    2> if the NDI has been not toggled compared to the value of the previous received transmission corresponding to this TB for the MBS process according to its associated SCI:
      3> allocate the TB received from the physical layer to the MBS process and consider this transmission to be a retransmission.
    2> else if the HARQ buffer of the MBS process is not empty:
      3> flush the HARQ buffer.

Example for the Behavior of MBS Process Contains at Least One of the Following Operations For each PDSCH duration where a transmission takes place for the MBS process, one TB and the associated HARQ information is received from the MBS HARQ Entity.

For each received TB and associated MBS transmission information, the MBS process may perform the following operations:

1> if this is a new transmission:

2> attempt to decode the received data.

1> else if this is a retransmission:

2> if the data for this TB has not yet been successfully decoded:

3> instruct the physical layer to combine the received data with the data currently in the soft buffer for this TB and attempt to decode the combined data.

1> if the data which the MAC entity attempted to decode was successfully decoded for this TB; or 1> if the data for this TB was successfully decoded before:

2> deliver the decoded MAC PDU to the disassembly and demultiplexing entity;

2> consider the MBS process as unoccupied.

1> else:

2> instruct the physical layer to replace the data in the soft buffer for this TB with the data which the MAC entity attempted to decode.

1> if HARQ feedback is enabled by the DCI or upper layer:

2> if HARQ feedback corresponding to this TB is configured with [a separate resource]; or 2> if HARQ feedback corresponding to this TB is configured with [a shared resource]:

3> instruct the physical layer to generate acknowledgement(s) of the data in this TB.

In another example, an information indicating the HARQ feedback is enabled or disabled is transmitted to the UE via a DCI or a MAC CE or a RRC message.

Example 7-2 describes an example of UE's behavior when HARQ processes are shared between unicast and multicast services. A HARQ entity manages a number of HARQ processes for both unicast and multicast services. The details of Example 7-2 is as follows.

In one example, the UE receives the latest instructions (e.g., DCI) and operates according to it. The behavior of UE's MAC entity contains at least one of the following operations.

When the MAC entity has a C-RNTI, Temporary C-RNTI, or CS-RNTI, or G-RNTI, the MAC entity may for each PDCCH occasion during which it monitors PDCCH and for each Serving Cell perform the following operations:

1> if a downlink assignment for this PDCCH occasion and this Serving Cell has been received on the PDCCH for the MAC entity's C-RNTI, or Temporary C RNTI:

2> if this is the first downlink assignment for this Temporary C-RNTI:

3> consider the NDI to have been toggled.

2> if the downlink assignment is for the MAC entity's C-RNTI, and if the previous downlink assignment indicated to the HARQ entity of the same HARQ process was either a downlink assignment received for the MAC entity's G-RNTI:

3> consider the NDI to have been toggled regardless of the value of the NDI.

2> indicate the presence of a downlink assignment and deliver the associated HARQ information to the HARQ entity.

1> if a downlink assignment for this PDCCH occasion and this Serving Cell has been received on the PDCCH for the MAC entity's G-RNTI:

2> if the downlink assignment is for the MAC entity's G-RNTI, and if the previous downlink assignment indicated to the HARQ entity of the same HARQ process was either a downlink assignment received for the MAC entity's CS-RNTI or C-RNTI or another G-RNTI or a configured downlink assignment:

3> consider the NDI to have been toggled regardless of the value of the NDI.

2> indicate the presence of a downlink assignment and deliver the associated HARQ information to the HARQ entity.

In another example, the behavior of UE is affected by the priority information and the received instructions (e.g., DCI). The HPN (HARQ process number) indicated in the HARQ information is used for the associated downlink assignment for G-RNTI. The behavior of UE's MAC entity contains at least one of the following operations.

When the MAC entity has a C-RNTI, Temporary C-RNTI, or CS-RNTI, or G-RNTI, the MAC entity may for each PDCCH occasion during which it monitors PDCCH and for each Serving Cell perform the following operations:

1> if a downlink assignment for this PDCCH occasion and this Serving Cell has been received on the PDCCH for the MAC entity's C-RNTI, or G-RNTI:

2> if the downlink assignment is for the MAC entity's C-RNTI, and if the previous downlink assignment indicated to the HARQ entity of the same HARQ process was a downlink assignment received for the MAC entity's G-RNTI with priority lower than C-RNTI, where the priority is indicated/configured by upper layers or indicated by MAC CE:

3> consider the NDI to have been toggled regardless of the value of the NDI.

3> indicate the presence of a downlink assignment for this Serving Cell and deliver the associated HARQ information to the HARQ entity.

2> if the downlink assignment is for the MAC entity's C-RNTI, and if the previous downlink assignment indicated to the HARQ entity of the same HARQ process was a downlink assignment received for the MAC entity's G-RNTI with priority higher than or equal to C-RNTI, where the priority is indicated/configured by upper layers or indicated by MAC CE:

3> ignore the downlink assignment.

2> if the downlink assignment is for the MAC entity's G-RNTI, and if the previous downlink assignment indicated to the HARQ entity of the same HARQ process was a downlink assignment received for the MAC entity's C-RNTI or another G-RNTI with priority lower than this G-RNTI, where the priority is indicated/configured by upper layers or indicated by MAC CE:

3> consider the NDI to have been toggled regardless of the value of the NDI.

3> indicate the presence of a downlink assignment for this Serving Cell and deliver the associated HARQ information to the HARQ entity.

2> if the downlink assignment is for the MAC entity's G-RNTI, and if the previous downlink assignment indicated to the HARQ entity of the same HARQ process was a downlink assignment received for the MAC entity's C-RNTI or another G-RNTI with priority higher than or equal to this G-RNTI, where the priority is indicated/configured by upper layers or indicated by MAC CE:

3> ignore the downlink assignment.

In another example, the behavior of UE is affected by the priority information and the received instructions (e.g., DCI). An occupied HPN (HARQ process number) can be used for the associated downlink assignment for G-RNTI. The behavior of UE's MAC entity contains at least one of the following operations.

When the MAC entity has a C-RNTI, Temporary C-RNTI, or CS-RNTI, or G-RNTI, the MAC entity may for each PDCCH occasion during which it monitors PDCCH and for each Serving Cell perform the following operations:

1> if a downlink assignment for this PDCCH occasion and this Serving Cell has been received on the PDCCH for the MAC entity's C-RNTI, or G-RNTI:

2> if the downlink assignment is for the MAC entity's C-RNTI, and if the previous downlink assignment indicated to the HARQ entity of the same HARQ process was a downlink assignment received for the MAC entity's G-RNTI with priority lower than C-RNTI, where the priority is indicated/configured by upper layers or indicated by MAC CE:

3> consider the NDI to have been toggled regardless of the value of the NDI.

3> indicate the presence of a downlink assignment for this Serving Cell and deliver the associated HARQ information to the HARQ entity.

2> if the downlink assignment is for the MAC entity's C-RNTI, and if the previous downlink assignment indicated to the HARQ entity of the same HARQ process was a downlink assignment received for the MAC entity's G-RNTI with priority higher than or equal to C-RNTI, where the priority is indicated/configured by upper layers or indicated by MAC CE:

3> ignore the downlink assignment.

2> if the downlink assignment is for the MAC entity's G-RNTI,

3> indicate the presence of a downlink assignment for this Serving Cell and deliver the associated HARQ information to the HARQ entity.

The HARQ entity can perform the following operations:

1> for each downlink assignment which is associated to G-RNTI and indicated to the HARQ entity:

2> if the NDI has been toggled compared to the value of the previous received transmission corresponding to this TB or this is the very first received transmission for this TB:

3> allocate the TB(s) received from the physical layer and the associated HARQ information to an unoccupied HARQ process, associate the HARQ process with this G-RNTI and consider this transmission to be a new transmission.

Note: When a new TB arrives, if there is no unoccupied HARQ process in the HARQ entity, the occupied HARQ process with lowest priority is allocated to an unoccupied MBS process. If there are several HARQ processes with the lowest priority, any one of these several HARQ processes can be allocated to this TB.

Figure 12:
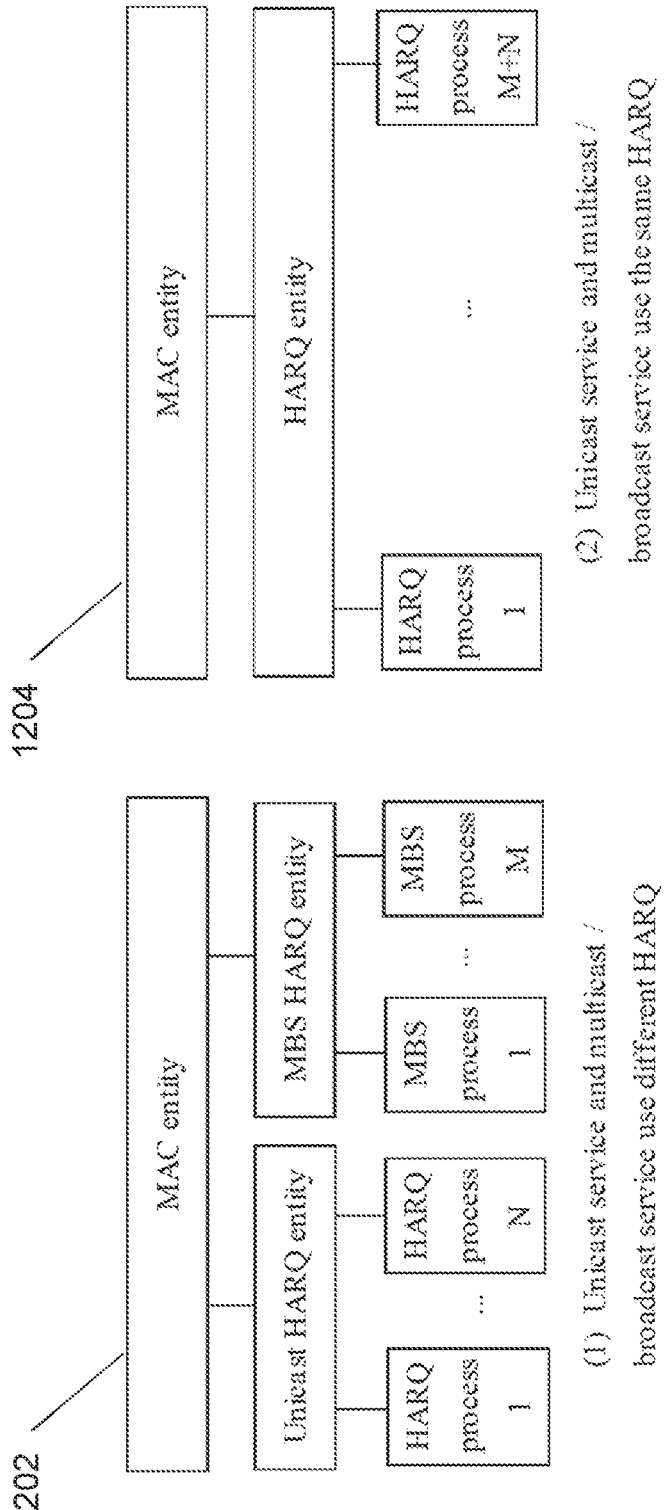
FIG. 12 shows an example block diagram of a relationship between a medium access control (MAC) entity and one or more hybrid automatic repeat request (HARQ) entities.

FIG. 12 shows an example block diagram of a relationship between a MAC entity and one or more HARQ entities. The left-hand side of FIG. 12 shows a relationship between the MAC entity 1202, HARQ entities and processes, where HARQ and MBS processes are not shared between unicast and MBS services. The right-hand side of FIG. 12 shows the relationship between the MAC entity 1204, a HARQ entity and HARQ processes, where the HARQ processes are shared by the unicast and MBS services.

Figure 3:
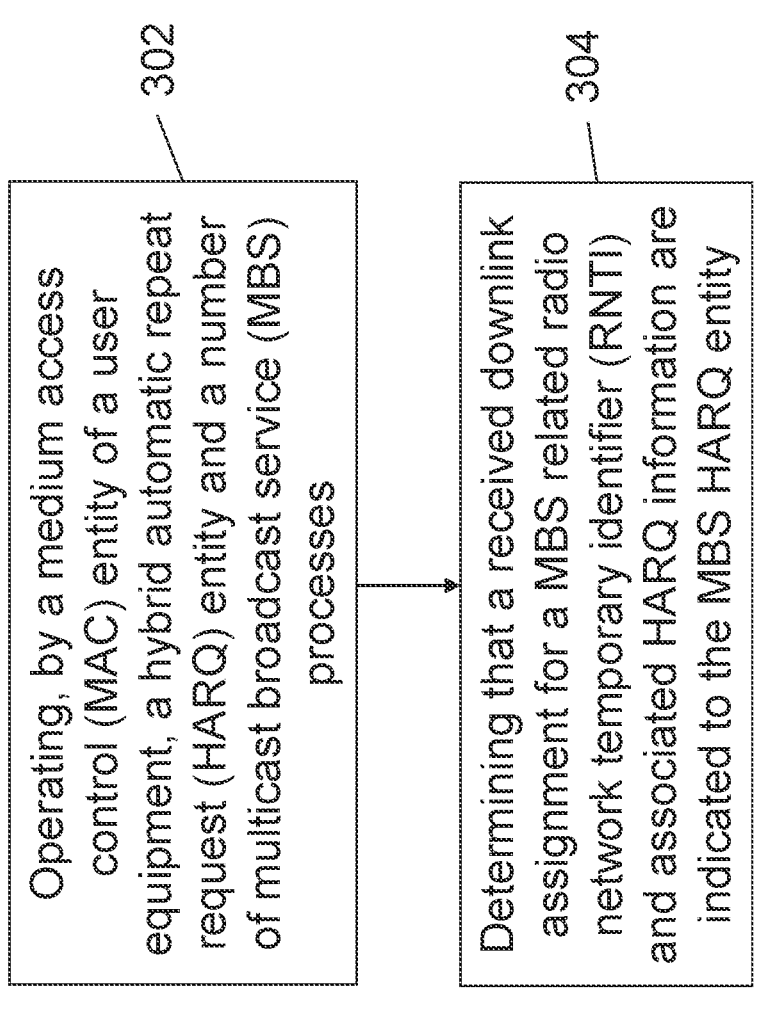
FIG. 3 shows an example flowchart for operating a MAC entity of a UE.

FIG. 3 shows an example flowchart for operating a MAC entity of a UE. Operation 302 includes determining, by a medium access control (MAC) entity of a user equipment, that a received downlink assignment for a MBS related radio network temporary identifier (RNTI) and associated hybrid automatic repeat request (HARQ) information are indicated to a HARQ entity, where the HARQ entity is a MBS HARQ entity for MBS services and manages MBS processes, and where for the downlink assignment, the MBS HARQ entity directs transport blocks (TBs) to a MBS process indicated in the associated HARQ information. In some embodiments, the MAC entity is configured to receive the downlink assignment associated with the MBS related RNTI by an upper layer.

Figure 4:
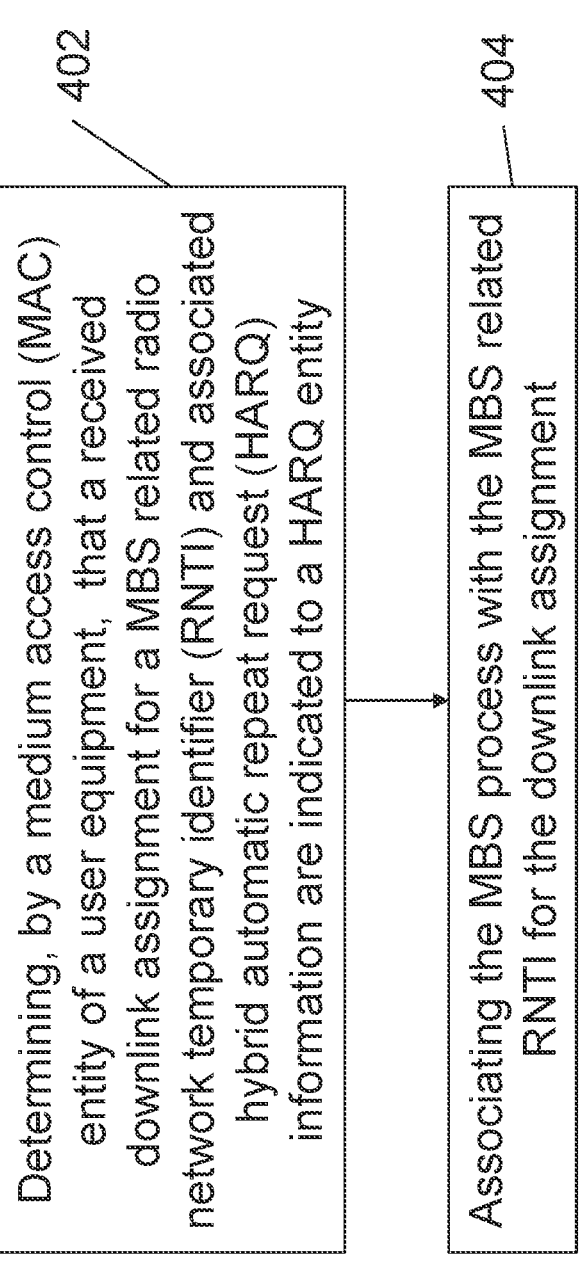
FIG. 4 shows an example flowchart for operating a MAC entity of a UE.

FIG. 4 shows an example flowchart for operating a MAC entity of a UE. Operation 402 includes determining, by a medium access control (MAC) entity of a user equipment, that a received downlink assignment for a MBS related radio network temporary identifier (RNTI) and associated hybrid automatic repeat request (HARQ) information are indicated to a HARQ entity, where the HARQ entity is a MBS HARQ entity for MBS services and manages MBS processes, and where for the downlink assignment, the MBS HARQ entity allocates one or more received transport blocks and associated HARQ information to an unoccupied MBS process. Operation 404 includes associating the MBS process with the MBS related RNTI for the downlink assignment.

In some embodiments, the method further includes performing the determination, upon receiving a new transport block, that the MBS HARQ entity does not include an unoccupied MBS process; and considering, in response to the performing the determination, an occupied MBS process who is corresponding to a MBS service with a lowest priority as an unoccupied MBS process. In some embodiments, the occupied MBS process is selected or randomly selected from a plurality of MBS processes having the lowest priority.

FIG. 5 shows an example flowchart for operating a MAC entity of a UE. Operation 502 includes operating, by a medium access control (MAC) entity of a user equipment, a hybrid automatic repeat request (HARQ) entity and a number of multicast and broadcast service (MBS) processes, where the HARQ entity is a MBS HARQ entity for MBS services, and where the MBS processes correspond to the MBS HARQ entity. Operation 504 includes receiving, for each duration on a shared channel where a transmission takes place for a MBS process, a transport block (TB) and an associated HARQ information from the MBS HARQ entity. Operation 506 includes upon determining that a HARQ feedback is enabled by a downlink control information (DCI): instructing a physical layer to generate an acknowledgement for data in the transport block in response to the HARQ feedback being configured for separate HARQ resources, or instructing the physical layer to generate the acknowledgement for data in the transport block in response to the HARQ feedback being configured for shared HARQ resources.

FIG. 6 shows an example flowchart for operating a HARQ entity and a HARQ process by a UE. Operation 602 includes operating, by a user equipment a hybrid automatic repeat request (HARQ) entity and a HARQ process that are shared by a multicast and broadcast service (MBS) and a unicast service. Operation 604 includes performing a first determination, by a user equipment, that a downlink assignment is received on a control channel, where the downlink assignment is for an occasion on the control channel and for a serving cell to which the user equipment is connected. Operation 606 includes performing a second determination that the downlink assignment is associated with a cell radio network temporary identifier (C-RNTI) of a medium access control (MAC) entity. Operation 608 includes performing a third determination that a previous downlink assignment indicated to the HARQ entity of the HARQ process is associated with a MBS related radio network temporary identifier (RNTI) of the MAC entity, where the previous downlink assignment is received prior to the downlink assignment. Operation 610 includes determining, based on the third determination, that a new data indicator (NDI) value is toggled.

FIG. 7 shows an example flowchart for operating a HARQ entity and a HARQ process by a UE. Operation 702 includes operating, by a user equipment a hybrid automatic repeat request (HARQ) entity and a HARQ process that are shared by a multicast and broadcast service (MBS) and a unicast service. Operation 704 includes performing a first determination, by a user equipment, that a downlink assignment is received on a control channel, where the downlink assignment is for an occasion on the control channel and for a serving cell to which the user equipment is connected. Operation 706 includes performing a second determination that the downlink assignment is associated with a MBS related radio network temporary identifier (RNTI) of a medium access control (MAC) entity. Operation 708 includes performing a third determination that a previous downlink assignment indicated to the HARQ entity of the HARQ process is associated with another MBS related RNTI of the MAC entity or a configured scheduling radio network temporary identifier (CS-RNTI) of the MAC entity or a cell radio network temporary identifier (C-RNTI) of the MAC entity or is a configured downlink assignment, where the previous downlink assignment is received prior to the downlink assignment. Operation 710 includes determining, based on the third determination, that a new data indicator (NDI) value is toggled.

FIG. 8 shows an example flowchart for operating a HARQ entity and a HARQ process by a UE. Operation 802 includes operating, by a user equipment a hybrid automatic repeat request (HARQ) entity and a HARQ process. Operation 804 includes performing a first determination, by a user equipment, that a downlink assignment is received on a control channel, wherein the downlink assignment is for an occasion on the control channel and for a serving cell to which the user equipment is connected; Operation 806 includes performing a second determination that the downlink assignment is associated with a cell radio network temporary identifier (C-RNTI); Operation 808 includes performing a third determination that a previous downlink assignment indicated to the HARQ entity of the HARQ process is associated with a MBS service having a priority that is lower than that of unicast services, wherein the previous downlink assignment is received prior to the downlink assignment. Operation 810 includes determining, based on the third determination, that a new data indicator (NDI) value is toggled. Operation 810 includes determining, based on the third determination, that a new data indicator (NDI) value is toggled. In some embodiments, priorities of the MBS related RNTI and the C-RNTI are indicated by an upper layer or by a medium access control-control element (MAC CE). In some embodiments, the method further includes providing, to the HARQ entity and in response to the third determination, HARQ information associated with data in the downlink assignment.

FIG. 9 shows an example flowchart for operating a HARQ entity and a HARQ process by a UE. Operation 902 includes operating, by a user equipment a hybrid automatic repeat request (HARQ) entity and a HARQ process. Operation 904 includes performing a first determination, by a user equipment, that a downlink assignment is received on a control channel, wherein the downlink assignment is for an occasion on the control channel and for a serving cell to which the user equipment is connected. Operation 906 includes performing a second determination that the downlink assignment is associated with a cell radio network temporary identifier (C-RNTI). Operation 908 includes performing a third determination that a previous downlink assignment indicated to the HARQ entity of the HARQ process is associated with a MBS service having a priority that is greater than or equal to that of unicast services, wherein the previous downlink assignment is received prior to the downlink assignment. Operation 910 includes determining that the downlink assignment is to be ignored.

FIG. 10A shows an example flowchart for operating a HARQ entity and a HARQ process by a UE. Operation 1002 includes operating, by a user equipment a hybrid automatic repeat request (HARQ) entity and a HARQ process. Operation 1004 includes performing a first determination, by a user equipment, that a downlink assignment is received on a control channel, where the downlink assignment is for an occasion on the control channel and for a serving cell to which the user equipment is connected. Operation 1006 includes performing a second determination that the downlink assignment is associated with a MBS related radio network temporary identifier (RNTI) of a medium access control (MAC) entity. Operation 1008 includes performing a third determination that a previous downlink assignment indicated to the HARQ entity of the HARQ process is associated with a cell radio network temporary identifier (C-RNTI) or another MBS related RNTI of the MAC entity having a priority that is lower than that of the MBS related RNTI, where the previous downlink assignment is received prior to the downlink assignment. Operation 1010 includes determining, based on the third determination, that a new data indicator (NDI) value is toggled. In some embodiments, priorities of the another MBS related RNTI and the C-RNTI are indicated by an upper layer or by a medium access control-control element (MAC CE). In some embodiments, the method further includes providing, to the HARQ entity and in response to the third determination, HARQ information associated with data in the downlink assignment.

FIG. 10B shows an example flowchart for operating a HARQ entity and a HARQ process by a UE. Operation 1052 includes operating, by a user equipment a hybrid automatic repeat request (HARQ) entity and a HARQ process that are shared by a multicast and broadcast service (MBS) and a unicast service. Operation 1054 includes performing a first determination, by a user equipment, that a downlink assignment is received on a control channel, where the downlink assignment is for an occasion on the control channel and for a serving cell to which the user equipment is connected. Operation 1056 includes performing a second determination that the downlink assignment is associated with a MBS related radio network temporary identifier (RNTI) of a medium access control (MAC) entity. Operation 1058 includes performing a third determination that a previous downlink assignment indicated to the HARQ entity of the HARQ process is associated with a cell radio network temporary identifier (C-RNTI) or another MBS related RNTI of the MAC entity having a priority that is greater than or equal to that of the MBS related RNTI, where the previous downlink assignment is received prior to the downlink assignment. Operation 1060 includes determining that the downlink assignment is to be ignored.

Figure 11:
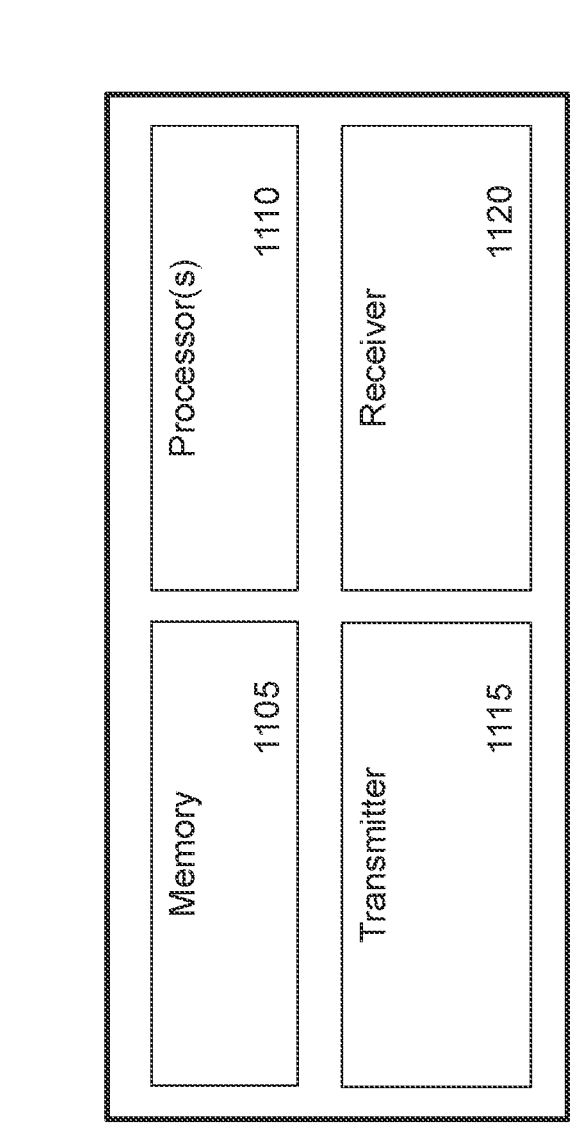
FIG. 11 shows an exemplary block diagram of a hardware platform that may be a part of a network node.

FIG. 11 shows an exemplary block diagram of a hardware platform 1100 that may be a part of a network node (e.g., user equipment or CU or DU or RAN node). The hardware platform 1100 includes at least one processor 1110 and a memory 1105 having instructions stored thereupon. The instructions upon execution by the processor 1110 configure the hardware platform 1100 to perform the operations described in FIGS. 1 to 10B and in the various embodiments described in this patent document. The transmitter 1115 transmits or sends information or data to another node. The receiver 1120 receives information or data transmitted or sent by another node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A wireless communication method, comprising:
receiving, by a base station from a core network, priority information that indicates a priority of a multicast and broadcast service (MBS), wherein the priority information includes a list of MBS services which one or more user equipment are receiving or are interested to receive and the list of MBS services includes one or more identifiers arranged in an order that indicates the priority of the one or more identifiers; and
determining, by the base station, based on the priority indicated by the priority information, a reception priority of the MBS.

2. The method of claim 1, wherein the priority information includes the priority of an identifier associated with the MBS.

3. The method of claim 1, wherein the identifier includes a MBS service identifier, a MBS session identifier, a temporary mobile group identifier (TMGI), a subset of a quality of services (QoS) flows in a MBS session, a multicast radio bearer (MRB) identifier, or a unique identification of an interface over which the a MBS service or a MBS session is established between the base station and the core network.

4. The method of claim 1, wherein the priority information includes an indication of whether one or more user equipment connected to the base station prioritizes reception of a plurality of multimedia broadcast multicast services (MBMS) above reception of any one unicast service.

5. The method of claim 1, wherein the priority information is associated with an identifier of a user equipment, or wherein the priority information is associated with a plurality of user equipment that are receiving or are interested to receive the MBS.

6. The method of claim 1, wherein the priority information is received via a next generation application protocol (NGAP) message using a MBS session-associated signaling.

7. The method of claim 1, wherein the priority information is received via a next generation application protocol (NGAP) message using a user equipment associated signaling.

8. The method of claim 1, wherein the priority information is received via a F1 application protocol (F1AP) message using a MBS session-associated signaling.

9. The method of claim 1, wherein the priority information is received via a F1 application protocol (F1AP) message using a user equipment associated signaling.

10. The method of claim 1, wherein the priority information is received via a radio resource control (RRC) message or a medium access control-control element (MAC CE) dedicated to a user equipment.

11. The method of claim 1, wherein the priority information is received via a radio resource control (RRC) message through a broadcast channel.

12. The method of claim 1, wherein the priority information is received via system information or a medium access control-control element (MAC CE) broadcast in a cell.

13. The method of claim 1, wherein the base station includes a distributed unit and the core network includes a centralized unit.

14. A wireless communication method, comprising:

determining, by a user equipment, that a number of a plurality of transmissions scheduled for the user equipment over a shared channel exceed a capability of the user equipment; and performing reception of one or more of the plurality of transmissions based on a priority of a multicast and broadcast service (MBS), wherein the priority of the MBS is indicated by an upper layer or by a medium access control element (MAC CE).

15. A wireless communication method, comprising:

determining, by a medium access control (MAC) entity of a user equipment, that a received downlink assignment for a MBS related radio network temporary identifier (RNTI) and associated hybrid automatic repeat request (HARQ) information are indicated to a HARQ entity, wherein the HARQ entity is a MBS HARQ entity for MBS services and manages MBS processes, and wherein for the downlink assignment, the MBS HARQ entity allocates one or more received transport blocks and associated HARQ information to an unoccupied MBS process;

associating the MBS process with the MBS related RNTI for the downlink assignment;

performing the determination, upon receiving a new transport block, that the MBS HARQ entity does not include an unoccupied MBS process; and considering, in response to the performing the determination, an occupied MBS process who is corresponding to a MBS service with a lowest priority as an unoccupied MBS process.

16. The method of claim 15, wherein the occupied MBS process is selected or randomly selected from a plurality of MBS processes having the lowest priority.

* * * * *